United States Patent [19]

Cantu-Garcia et al.

[11] Patent Number: 4,668,269
[45] Date of Patent: May 26, 1987

[54] SYSTEM AND METHOD FOR THE INTERNAL COOLING OF HOT MOLDS

[75] Inventors: Rolando Cantu-Garcia, Garza Garcia; Elio Marroquin-Garza, Monterrey, both of Mexico

[73] Assignee: Vidriera Monterrey, S.A., Monterrey, Mexico

[21] Appl. No.: 876,180

[22] Filed: Jun. 19, 1986

[51] Int. Cl.$^4$ .............................................. C03B 9/38
[52] U.S. Cl. ........................................ 65/68; 65/83; 65/265; 65/319; 65/356
[58] Field of Search ................ 65/68, 83, 265, 319, 65/356

[56] References Cited

U.S. PATENT DOCUMENTS

| | | | |
|---|---|---|---|
| 4,251,253 | 2/1981 | Becker et al. | 65/319 X |
| 4,502,879 | 3/1985 | Foster | 65/265 X |
| 4,525,191 | 6/1985 | Fenton | 65/265 X |
| 4,556,405 | 12/1985 | Luna | 65/83 X |
| 4,578,104 | 3/1986 | Jones | 65/319 X |

Primary Examiner—Arthur Kellogg
Attorney, Agent, or Firm—Abelman Frayne Rezac & Schwab

[57] ABSTRACT

Hot molds are internally cooled by providing a plurality of cooling passages having first and second opened ends, in the body of said molds; a plurality of blowing heads, each of which having an inner flow convertor defining an inner anular chamber and a central suctioning passage, and is coupled to the first end of a corresponding cooling passage, in order to provide a tangential flow of cooling air to said cooling passage causing a swirl cooling current therethrough, which is accelerated by an air current that is suctioned through the suctioning passage of the blowing head, and which afterwards is exhausted through the second end of said cooling passage; and cooling air feeding means correspondingly coupled to each of said blowing heads, providing a flow of cooling air to said blowing heads.

12 Claims, 3 Drawing Figures

SYSTEM AND METHOD FOR THE INTERNAL COOLING OF HOT MOLDS

FIELD OF THE INVENTION

This invention is related with the cooling of hot molds, and more specifically with a system and a method for the internal cooling of hot molds in glassware article forming machines.

BACKGROUND OF THE INVENTION

High production rates of quality glassware articles such as glass containers, require that thermal energy be removed rapidly from the soft glass while it is blown or press formed against a mold.

For effecting very high rates of convective cooling, a fluid (usually air) is injected inside the glass.

Enhancement of this cooling mode was found when the cooling air inlet flow was introduced on the periphery of a hollow article with tangential flow causing a swirl current which afterwards is exhausted coaxially up from the center of said swirl current, as claimed and described in the U.S. Pat. No. 4,566,405.

Limited heat transference can also be effected by internally cooling the mold and therefore the outer wall of the glass.

This is achieved by providing a plurality of axial passages in the body of the mold or mold halves and introducing an air flow through said passages, from the botton to the top thereof, as described in U.S. Pat. Nos. 1,875,202; 3,355,277; 4,251,253 and 4,502,879.

In some of those cooling systems the molds keeps gradually accummulating heat because generally those cooling systems perform the cooling action only when the molds are closed but not when they are opened.

Furthermore the air flow within the passages is laminar and does not allows an effective heat extraction from the mold, because a rather static layer or film of hot air is formed along the internal wall of the passages.

Said rather static film of hot air in the walls of the passages is avoided and an improved heat transference is achieved in accordance with the present invention by providing a plurality of axial cooling passages having two opened ends, in the body of the molds or mold halves and a plurality of blowing heads each of which comprising an internal flow convertor and a central suctioning passage and is coupled to the top end of said cooling passages, in order to provide a continuous tangential flow of cooling air causing a swirl current downstream through the passages which is acelerated by a current of air that is suctioned through the central suctioning passage of the blowing heads and which afterwards is continuously exhausted through the bottom end of said cooling passages, efficiently cooling the molds and consequently the articles which are being formed, even when said molds or mold halves be in its opened state.

SUMMARY OF THE INVENTION

It is therefore a main object of the present invention, to provide a system and a method for the internal cooling of hot molds which is able to continuously cooling said molds both in their opened and closed positions by providing a plurality of cooling passages in said molds and a plurality of blowing heads which provide a swirl cooling air current which afterwards is continuously exhausted through an opened end of said cooling passages, in order to improve the heat tranference from the articles which are being formed, to the molds, and from the molds to the environment.

It is also a main object of the present invention, to provide a system for the internal cooling of hot molds, comprising a mold body having a plurality of cooling passages and a plurality of blowing heads each of which having an inner flow convertor defining an inner anular chamber and a central suctioning passage and is coupled to said cooling passage in order to provide a swirl cooling current which is accelerated by an air current that is suctioned through the central suctioning passage of the blowing head and which afterwards is exhausted through the opened end of said cooling passages improving in this way the mechanism of the heat transference between the molds and the articles which they are forming.

It is also a main object of the present invention, to provide a method for the internal cooling of hot molds, by providing a plurality of cooling passages in the body of said molds; providing a plurality of blowing heads correspondingly coupled to said cooling passages; introducing an air stream tangentially through said blowing heads in order to provide a swirl cooling current through said cooling passages, introducing an air current through the center of said blowing heads in order to accelerate said swirl current; and exausting said accelerated swirl cooling current through the opened end of said passages.

These and other objects and adventages of the present invention will be apparent to the persons skilled in the art, from the following detailed description of the invention which is provided in combination with the accompanying drawings.

DETAILED DESCRIPTION OF THE INVENTION

Figure 1:
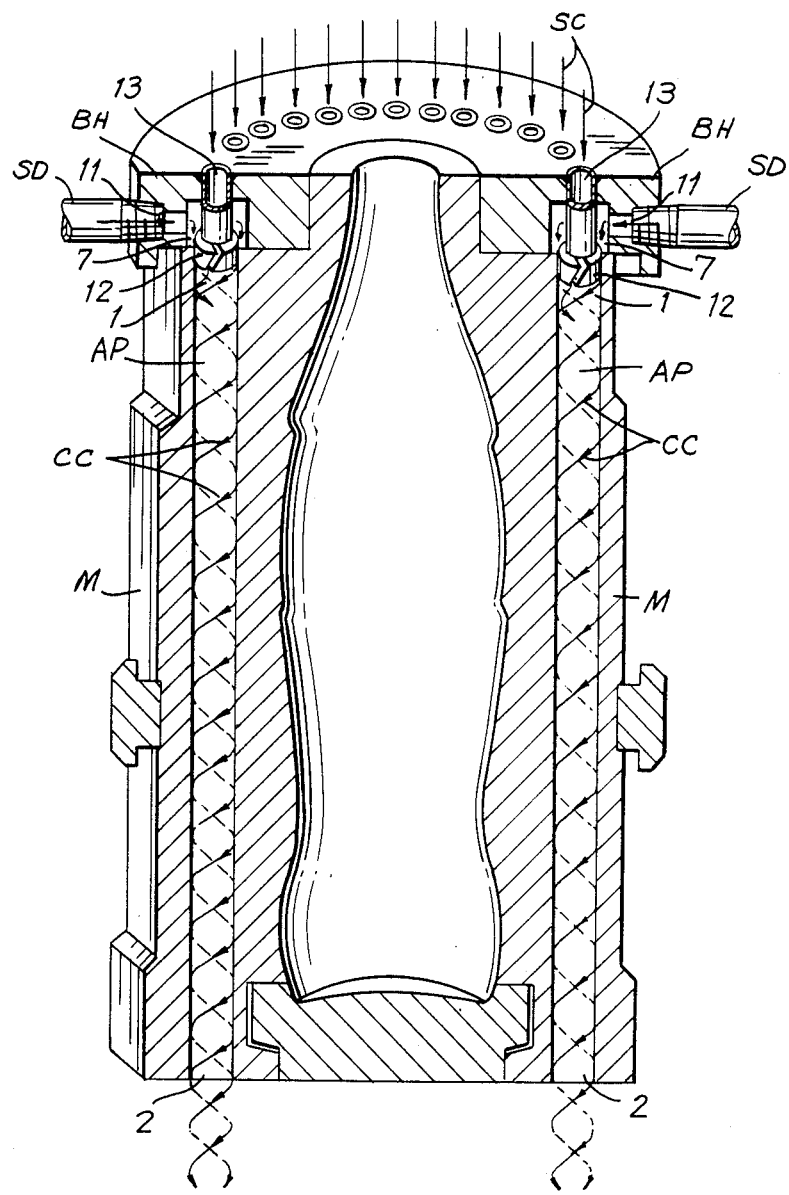
FIG. 1 is a cross sectional view of a glassware article forming mold, incorporating an specific application of the system for the internal cooling of hot molds, of the present invention.
Figure 2:
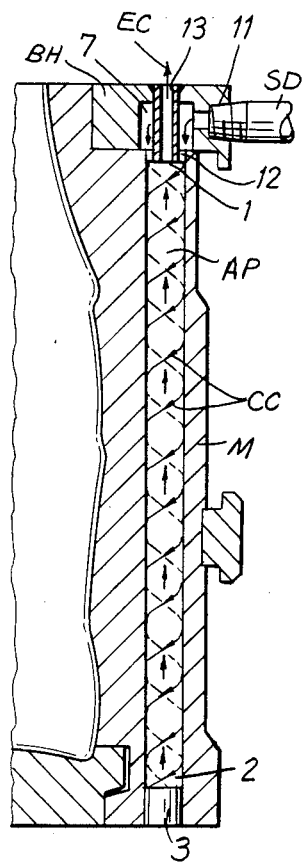
FIG. 2 is a similar partial view of FIG. 1, showing a second embodiment of the present invention.

Referring to FIG. 1, in a mold M of the type used for the glassware article formation such as bottles, in glassware article forming machines as those known as I.S. machines comprising a plurality of individual sections each of which including two mold halves articulated by one of its end sides (illustrated only one half in FIG. 1); a system for the internal cooling of said hot molds comprising, in accordance with the present invention: a plurality of axial cooling passages AP having a top end 1 and a bottom end 2, in the body of said mold M; a plurality of blowing heads BH each of which comprising an air feeding nozzle 11 and a flow convertor 12 within the blowing head BH which defines an annular chamber 7 with the interior of said blow head BH and a tubular suctioning passage 13, each of said blowing heads BH is correspondingly coupled to the top end 1 of said axial cooling passage AP, in order to provide a tangential flow of cooling air to said cooling passage AP causing a swirl cooling current represented by the swirl arrows CC down to said cooling passages AP which is accelerated by an air current SC that is suctioned down through the suctioning passage 13 of said blowing head by the sole action of said swirl current, and which afterwards is exhausted through the bottom end 2 of said cooling passages AP; and a plurality of cooling air supply ducts SD correspondingly coupled tangentially to the air feeding nozle of the blowing head. This blow head BH may be threadedly or pin coupled to the top aperture 2 of said passages AP.

Instead of providing an individual supply duct SD for each blowing head, a manifold (not illustrated) having a tubular suctioning passage for each blowing head, may be provided on the top of each mold halve.

In a second embodiment of the invention, each of said cooling passages AP may have a plug 3 closing the bottom end 2, so that the swirl cooling current provided by the corresponding blowing heads BH down to said cooling passages AP, reachs the closed end and be exhausted coaxially up within said swirl current through the tubular passage 13 of the blowing head BH.

Figure 3:
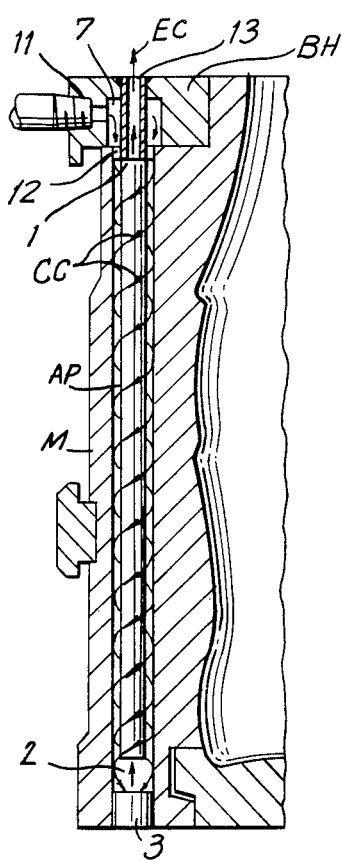
FIG. 3 is another similar similar partial view of FIG. 1 showing a third embodiment of the invention.

As is shown in the embodiment of FIG. 3, in order to avoid interference and undesired heat transference between the input swirl cooling current and the coaxially up exhausting current, the tubular passage 13 of the blow head BH may be extended down, near to the bottom of the passage AP, as is shown.

Finally, it has to be understood that the word "mold" is not limitative, it may refer to the blanck or parison molds, blow forming molds or any other body to be controllably cooled.

The method of the present invention comprising providing a plurality of axial cooling passages AP in the body of the molds M, having two opened ends; providing a plurality of blowing heads BH correspondingly coupled to the top ends 1 of said passages AP; and introducing a cooling air stream tangentially to said blowing heads BW in order to provide a swirl cooling current CC down the axial passage AP and an acceleration air current SC which is suctioned through said blowing head because of said swirl current CC, and which afterwards are exhausted through the opened bottom end 2 of said passages AP.

As another embodiment, this method comprises plugging the bottom end 2 of the passages AP and causing the swirl current down to said passages AP to be exhausted coaxially up EC, through the center of said swirl current CC and through the tubular passage 13 of said blowing heads BH, effectively cooling said mold M as well as the articles which are being formed thereinto.

Said passages AP and the blowing heads BH or manifold may be distributed axially surronding the mold or mold halves; the blow heads may be coupled to the bottom end of the molds, and even said passages AP may be distributed transversally through the periphery of said mold body. Furthermore, said molds may be hot bodies other than glassware forming molds which require cooling in a controlled way.

What is claimed is:

1. A system for the internal cooling of hot molds, comprising: a mold body having a plurality of cooling passages, each of which having first and second opened ends; a plurality of blowing heads each of which having an inner flow convertor defining an inner annular passage and is coupled to the first end of a corresponding cooling passage of said mold body, in order to provide a tangential flow of cooling air to said cooling passage, causing a swirl current therethrough and which afterwards is exhausted through the second opened end of said cooling passage; and cooling air feeding means coupled to said blowing heads.

2. A system as claimed in claim 1, wherein said flow convertor further comprising a central passage in in said blowing head, in order to provide an acceleraton air current which is suctioned through said central passage because of the swirl current.

3. A system as claimed in claim 1, wherein each of said cooling passages comprising a plug coupled to its second opened end so that said swirl current reach to said plug and afterwards be exhausted coaxially within said swirl current and through the central exhausting passage of said blowing head.

4. A system as claimed in claim 1, wherein the cooling passages are distributed axially around the body of the molds.

5. A system as claimed in claim 1, wherein the cooling passages are distributed transversally to said molds.

6. A system as claimed in claim 1, wherein the central passage of the blow heads, comprising a conduit extending near to the plugged end of the cooling passage.

7. A system as claimed in claim 1, wherein the cooling air feeding means comprising a plurality of ducts, each of which is coupled respectively to each of said blowing heads.

8. A system as claimed in claim 1, wherein the cooling air feeding means comprising a manifold coupled to said blowing heads, having internal passages which coincide with the central passages of said blowing heads.

9. A method for the internal cooling of hot molds, comprising: providing a plurality of cooling passages having two opened ends, in the body of said molds; providing a plurality of blowing heads each of which having an inner flow convertor defining an inner annular chamber and is coupled to one end of a corresponding cooling passage; and introducing an air stream tangentially to said blowing heads in order to provide a swirl cooling current through said cooling passages, which afterwards is exhausted through the free end of said cooling passage.

10. A method as claimed in claim 9, further comprising aaccelerate the swirl cooling current through said cooling passages by allowing an air current to be succtioned through a central passage defined in the flow convertor of the blowing head, caused by said swirl current.

11. A method as claimed in claim 9, further comprising plugging the free end of said cooling passages in order for the swirl current to reach said plugging and be exhausted coaxially within the center of said swirl current and through the central passage of the flow convertor of the blowing head.

12. A system as claimed in claim 2, wherein each of said cooling passages comprising a plug coupled to its second opened end so that said swirl current reach to said plug and afterwards be exhausted coaxially within said swirl current and through the central exhausting passage of said blowing head.

* * * * *